United States Patent [19]
Paul, Jr.

[11] 3,749,355
[45] July 31, 1973

[54] VENTURI-BALL VALVE NO. 103

[76] Inventor: Herman L. Paul, Jr., 720 Old Mill Rd., Wyomissing, Pa. 19610

[22] Filed: Nov. 17, 1971

[21] Appl. No.: 199,519

[52] U.S. Cl........... 251/124, 137/454.6, 137/DIG. 2
[51] Int. Cl............................................. F16k 47/00
[58] Field of Search............................ 251/124, 211; 137/454.6, 595, 625.48, DIG. 2

[56] References Cited
UNITED STATES PATENTS

| | | | |
|---|---|---|---|
| 3,658,087 | 4/1972 | Nelson | 137/454.6 |
| 1,334,870 | 3/1920 | Lowry | 251/211 |
| 2,750,962 | 6/1956 | Kreitchman et al. | 137/625.48 |
| 3,506,030 | 4/1970 | Vesco | 137/595 |
| 3,273,851 | 9/1966 | Rosch et al. | 251/124 |

Primary Examiner—Henry T. Klinksiek
Attorney—Thomas E. Tate

[57] ABSTRACT

A venturi-ball valve including a body having inwardly tapering, coaxial inlet and outlet passages and an opening extending downwardly from the top of the body and communicating with the inner ends of the passages. Projecting into the body opening and extending beyond the inner ends of the inlet and outlet passages is a tubular retainer which carries a pair of spaced, removable seat rings, one of the seat rings being positioned at the juncture of the body opening and the inlet passage and the other at the juncture of the body opening and the outlet passage. A ball cage containing a sealing ball is slidable along the interior of the retainer and the inner ends of the seat rings by means of an operating stem which projects into the retainer. The ball permits or prevents fluid flow through the outlet passage depending on the position of the cage in the tubular retainer. The tubular retainer, the seat rings, the ball cage and the operating stem constitute a subassembly which may be readily positioned in the body opening at the time of assembly and removed therefrom for purposes of inspection or replacement of parts subject to wear, such as the seat rings, without disconnecting the valve from the flow line.

1 Claim, 1 Drawing Figure

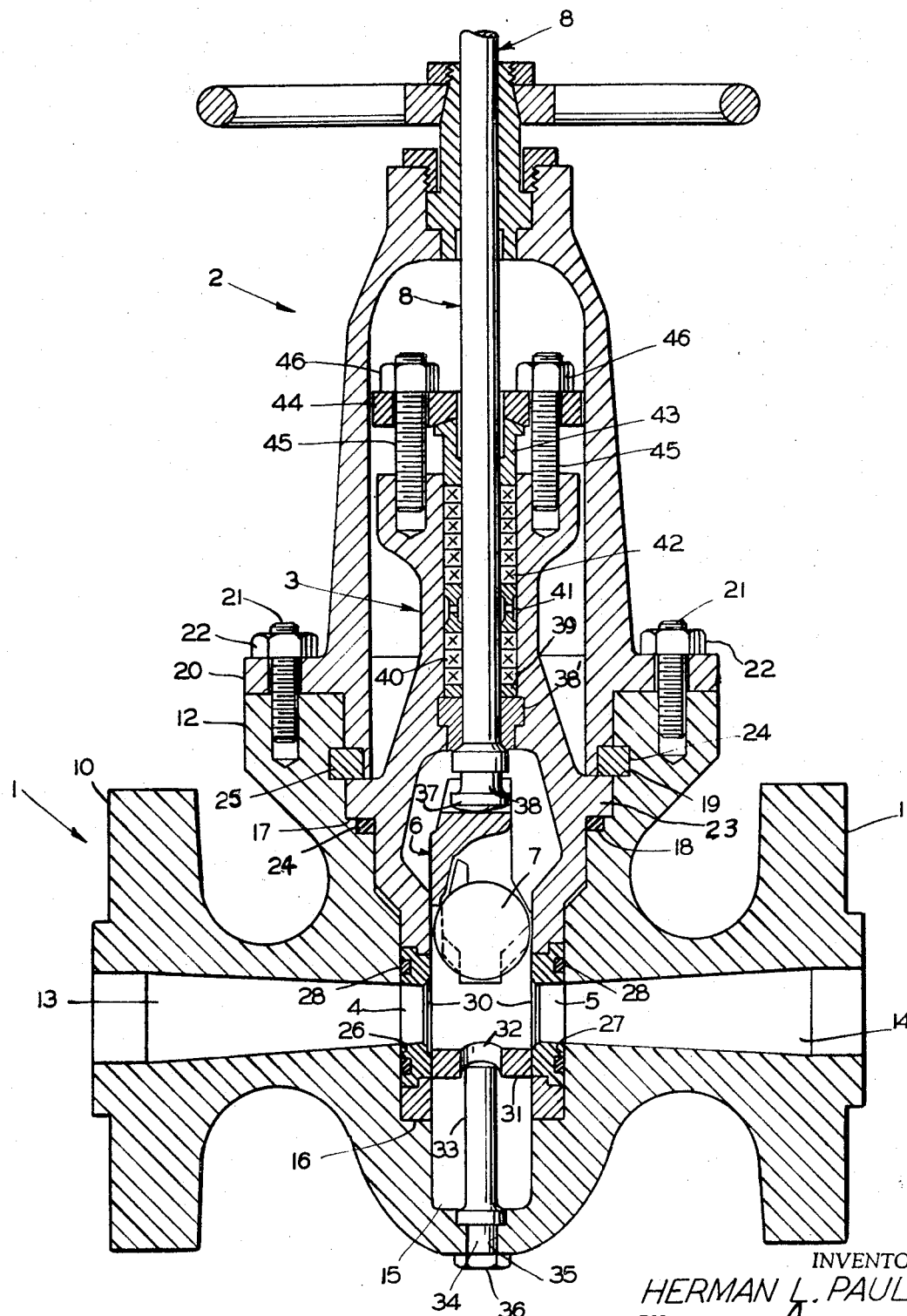

VENTURI-BALL VALVE NO. 103

BACKGROUND OF THE INVENTION

This invention relates to the art of valves for controlling fluid flow and, more particularly, to a ball type control valve having improved features of design and construction. The invention pertains, in one of its more specific aspects, to a ball valve having its parts so constructed and arranged as to permit ready removal and replacement of seat rings for the ball, as required, without disconnecting the valve from a flow line after installation has been completed.

The valve art is one of the oldest and most highly developed industrial fields. This art includes a wide variety of mechanical control valves, including ball valves. There have been many advances over the years in ball-type control valves. Such advances are exemplified by the ball valves disclosed in several of my United States patents, namely, U.S. Pat. No. 2,666,617, No. 2,923,316 and No. 3,264,718, which are related in a broad sense to the subject inventive valve.

The present ball valve differs in a number of respects over the valves of my above-identified patents and other known prior art valves. For one thing, the parts of this valve are so constructed and arranged as to permit of ready access to and withdrawal of removable seat rings from the valve for purposes of inspection or replacement. This is accomplished without disconnecting the valve from the flow line after it has been installed in the line.

As will be manifest from the ensuing discussion and detailed description, the ball valve of this invention affords a number of worthwhile advantages and benefits which contribute substantially to its improved utility as compared to similar known valves.

SUMMARY OF THE INVENTION

The ball valve of this invention includes a body having horizontal inlet and outlet passages and an opening extending downwardly from the top of the body and communicating with these passages. Projecting into the body opening is a tubular seat retainer which is provided with a pair of oppositely arranged openings for reception of corresponding removable seat rings that establish communication between the inlet and outlet passages and the interior of the tubular member. A ball cage is disposed within and slidable along the tubular member and carries a movable ball which is adapted to engage and provide an effective seal with the seat ring nearest the outlet passage. The valve also includes operating means, such as a stem, for actuating the cage whereby to adjust the position of the ball and correspondingly control fluid flow to the outlet passage. The stem is positioned at least partly within the tubular member and is connected to the cage. The tubular member, the seat rings, the cage and ball and the operating stem constitute a subassembly which may be readily positioned in the body opening at the time of assembly and withdrawn from the body opening for purposes of inspection and/or replacement of parts, such as the seat rings, which are more subject to wear than other parts. The valve is provided with an element, preferably a pin, which is positioned in the lower part of the body opening and is adapted to project into the cage and engage the ball upon predetermined downward sliding movement of the cage.

The primary object of this invention is to provide a ball valve having improved features of design and contruction.

Another object of the invention is to provide a ball valve in which a subassembly, comprised of a tubular retainer, a ball cage, an operating stem for actuating the cage and a pair of removable seat rings, is adapted to be readily withdrawn from the valve to permit of quick access to the seat rings, as may be required for purposes of inspection or replacement, without disconnecting the valve from a fluid flow line after it has been installed in the line.

A further object of the invention is to provide a ball valve, including the subassembly referred to in the preceding object, in which the ball cage cooperates with the tubular retainer to positively maintain the seat rings in proper position at all times with respect to the valve inlet and outlet passages.

A still further object of the invention is to provide a ball valve of the character indicated which is relatively simple and compact in design; which is rugged and durable in construction; which is reasonable in manufacturing, installation and maintenance costs; which may be made in a wide range of sizes and flow capacities; which permits of ready removal and replacement of parts that are subject to wear; and which is adapted to perform its intended functions in an efficient and trouble-free manner.

The enumerated objects and additional objects, together with the advantages of this invention, will be evident to persons trained in the art from the following detailed description and the accompanying drawing which respectively describe and illustrate a preferred embodiment of the invention.

BRIEF DESCRIPTION OF THE DRAWING

The single FIGURE of the drawing is a central, vertical, sectional view of a ball valve constructed in accordance with this invention.

DESCRIPTION OF THE PREFERRED EMBODIMENT

Referring to the drawing, the therein illustrated ball valve comprises a number of principal parts, namely, a body 1, a bonnet 2, a retainer 3, a pair of seat rings 4 and 5, a ball cage 6 containing a sealing ball 7, and an operating stem 8. These parts and other parts associated therewith will now be described.

Body 1 is made of a suitable metal, preferably an appropriate steel alloy, and is provided with a pair of end flanges 10 and 11 and a top flange 12. The body is formed with an inlet passage 13 which tapers inwardly from flange 10 and an outlet passage 14 which tapers inwardly from flange 11. The inlet and outlet passages are coaxial. The body is also formed with a vertical opening 15 which is normal to the axis of the inlet and outlet passages and which communicates with those passages. Successive portions of opening 15 vary in diameter, as shown. The body is machined or otherwise formed to define annular shoulders 16 and 17 and annular recesses 18 and 19 which merge with opening 15. Body 1 is adapted to be placed in a fluid flow line (not shown) with its flange 10 connected to the upstream side of the flow line and with its flange 11 connected to the downstream side of the flow line. The connections between the flanges and the flow line may be temporary, such as by the use of removable bolts or the like, or permanent, such as by welding.

Bonnet 2 is also preferably made of a suitable steel alloy and is open at each end. The bonnet is provided with a flange 20 which is coupled to body flange 12 by a plurality of studs 21 and corresponding nuts 22.

Retainer 3 is tubular, is open at each end and is provided with an external flange 23 intermediate its ends. The retainer is adapted to be inserted in body opening 15 and positioned, as illustrated, with its lower end bearing against body shoulder 16 and its flange 23 bearing against body shoulder 17. A ring gasket 24 and a split ring 25 are respectively located in recesses 18 and 19. Retainer 3 is formed with a pair of diametrically opposed recessed openings 26 and 27 for receiving and removably retaining respective seat rings 4 and 5.

Seat rings 4 and 5 are preferably made of stainless steel and are identical. Seat ring 4 registers with retainer opening 26 while seat ring 5 registers with retainer opening 27. Each seat ring is equipped with a ring gasket 28. The opposing ends of the seat rings are machined to obtain corresponding recessed seat surfaces 30. Valve ball 7 is adapted to bear against seat surface 30 of seat ring 5 and cooperate therewith to attain an effective seal when the valve is in closed position.

Ball cage 6 is generally the same as that disclosed in my said U.S. Pat. No. 3,264,718 to which reference may be had for details of construction in addition to those appearing herein. Cage 6 includes a bottom end wall 31 having a central through opening 32 to freely accommodate the upper portion of pin 33 which has a threaded lower end part 34 that extends through an opening 35 in body 1 and is secured thereto by a nut 36. The ball cage is provided with a slotted upper end 37. The cage is slidable in the lower portion of retainer 3. The cage also bears against seat rings 4 and 5 and maintains them in proper position at all times with respect to inlet passage 13 and outlet passage 14.

Reference is next had to operating stem 8 which, as illustrated, extends through the upper end of bonnet 2 and into the upper portion of retainer 3. The operating stem is provided at its lower end with a grooved head 38 that engages and cooperates with the slotted upper end 37 of the ball cage. Coaxial with the operating stem and arranged as shown, are a bushing 38', a spacer ring 39, packing 40, a lantern ring 41, packing 42, a gland 43 and a follower ring 44 which is affixed to the upper end of the bonnet by studs 45 and nuts 46.

Retainer 3, seat rings 4 and 5, cage 6 with its ball 7, operating stem 8 and other parts directly associated with the retainer constitute a subassembly which may be easily and quickly installed in valve body 1 or withdrawn from the valve body, as may be required for purposes of inspection and/or replacement of parts, such as the seat rings, which are critical elements and are more subject to wear than other parts. This is believed evident from an inspection of the drawing.

The valve is illustrated in open position, cage 6 and ball 7 being raised to their uppermost condition, allowing fluid flow through the valve. Such flow may be readily controlled by lowering the cage relative to the body whereby ball 7 partially or completely cuts off fluid flow. When the cage is in its lowermost position, ball 7 is forced by the pressure of fluid in inlet passage 13 to bear against sealing surface 30 of seat ring 5, thereby preventing flow into outlet passage 14. Pin 33 cooperates with ball 7 when the valve is in closed position to assure mating of the ball with seat surface 30 of seat ring 5.

Based on the foregoing, it is believed that the construction, operation, objects and advantages of my present invention will be readily comprehended by persons skilled in the art, without further description. It is to be clearly understood, however, that various changes in the construction described above and illustrated in the drawing may be made without departing from the scope of the invention, it being intended that all matter contained in the description or shown in the drawing shall be interpreted as illustrative only and not in a limiting sense.

I claim:

1. A valve comprising a body having inwardly tapering coaxial horizontal inlet an outlet passages and a vertical opening extending downwardly from the top of said body, said opening communicating with and terminating below said passages; a generally tubular seat retainer removably affixed to said body and provided with a depending portion fitted into said vertical opening and extending downwardly below said inlet and outlet passages, said depending portion being provided with an opposed pair of outwardly stepped openings coaxial with said inlet and outlet when said seat retainer is in its installed position, a valve seat ring removably fitted into each of said stepped openings and having an inwardly exposed annular valve seat of progressively decreasing diameter from its exposed inner face toward it opposite face, said seat rings being readily removable from said outwardly stepped openings whenever said seat retainer is removed from said body; removable means for retaining said seat retainer in its normally installed position; a ball cage reciprocably mounted within the said depending portion of said seat retainer and provided with a valve ball freely movable therein; means operably connected to said ball cage for reciprocating same between upper and lower positions; said ball cage, when in its lower position, being effective to permit said ball to move into position for line-contact seating against the annular seat of that seat ring that is associated with said outlet passage and close said passage, and when in an upper position, being effective to at least partly displace said ball out of its seated relation with respect to said annular seat; and means carried by said body for preventing said ball from moving below a predetermined lower limit of travel as said ball cage approaches it lower limit of movement.

* * * * *